Oct. 28, 1969    D. ZIMMET    3,474,621
SLIDE VALVE FOR ROCKET MOTORS
Filed July 5, 1963

INVENTOR.
DONALD ZIMMET
BY
*William R. Wright*
AGENT

United States Patent Office 3,474,621
Patented Oct. 28, 1969

3,474,621
SLIDE VALVE FOR ROCKET MOTORS
Donald Zimmet, River Edge, N.J., assignor to Thiokol Chemical Corporation, Bristol, Pa., a corporation of Delaware
Filed July 5, 1963, Ser. No. 293,010
Int. Cl. F02g *3/00;* F02c *3/12;* F02k *9/02*
U.S. Cl. 60—39.48                        5 Claims This invention relates generally to fluid flow controlling apparatus and more particularly to a valve mechanism which initially meters fluid flow and subsequently is operable to effect a large flow thereof.

While the invention is susceptible of many and varied applications, it is of particular use in fluid flow control apparatus in situations where it is highly desirable to avoid a high pressure drop after low initial flow as in steady state operation after the starting of liquid propellant rocket powerplants.

To ensure the flow of propellant from its tank to the combustion chamber, the propellant tankage of such powerplants is pressurized by means of pressure gases conducted thereto from a gas generating chamber usually containing a solid propellant grain which is ignited by an electrical signal, etc. In order to minimize powerplant ignition shock, it is necessary to restrict the rate of pressurizing gas flow into the tankage during the initial ignition phase. However, it is also necessary subsequent thereto to avoid a high pressure drop in the pressurizing system due to the demands of steady state operation of the powerplant.

The provision of a single but simple and adequate means for avoiding such ignition shock and subsequent high pressure drop has theretofore been a major problem in the industry and the main object of the present invention is to provide such valve-type mechanism.

An important object of the present invention is to provide an improved fluid flow controlling valve-type mechanism having a variable orifice.

Another important object of the present invention is to provide an improved fluid flow controlling means for a fluid conduit which initially meters fluid flow therethrough until a valve mechanism is actuated by the fluid pressure which then permits a large flow of pressure fluid.

A further important object of the present invention is to provide an improved pressurizing gas flow controlling means for packaged liquid propellant rocket powerplants having valve devices of the shear slide type, which means initially meters the pressurizing gases to the propellant tankage during the initial ignition phase and then is effective upon slide movement to permit a large flow of the pressurizing gases to the tankage during steady state operation.

A still further object of the present invention is to provide an improved valve mechanism of the type described which may readily be installed in liquid propellant rocket powerplants with little or no modification thereof and which will be simple in construction, reliable in operation, and economical of manufacture.

Other objects and advantages of the present invention will become readily apparent during the course of the following description.

In its broadest aspects, the invention contemplates the installation in a fluid flow line of a valve body having metering orifices, and a member movable upon the attainment of a predetermined fluid of pressure in the flow line to permit a larger flow of fluid through the valve body.

In the drawings, I have shown one embodiment of the invention. In this showing:

Figure 1:
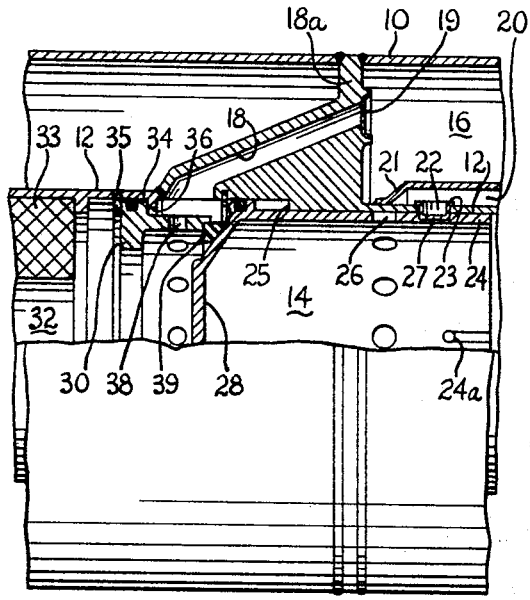
FIGURE 1 is a fragmentary, central, longitudinal sectional view of the invention in fluid flow metering position.

While the invention may be installed in any desired fluid flow line, for purposes of illustration it is shown installed at the aft end of the gas generator chamber of a liquid propellant rocket powerplant having a shear slide which is combined in a novel manner with the valve body of the invention to act as the movable member. Also, while the invention is readily applicable to bipropellant and multi-stage thrust chamber powerplants, it is shown in connection with a single stage thrust chamber using a monopropellant.

Referring to the drawings, numeral 10 designates the outer shell of a liquid propellant rocket powerplant having an inner shell 12 defining a central combustion chamber 14 terminating in an exhaust nozzle (not shown). The two shells define an annular propellant tank 16 to which pressurizing gases are conducted by a conduit 18 terminating at the tank bulkhead 18*a*, the inlet into the tank being sealed by a burst disc 19 adapted to be ruptured by pressurizing gases upon firing of the powerplant.

The combustion chamber 14 may be regeneratively cooled by the provision of a tank mounted baffle 21 which is spaced from the inner shell and the aft tank end to provide a propellant passage 20 which communicates with a plurality of fluid inlet ports 22 sealed by a shear cup 23 in the inner shell 12 defining the thrust or combustion chamber 14.

Figure 2:
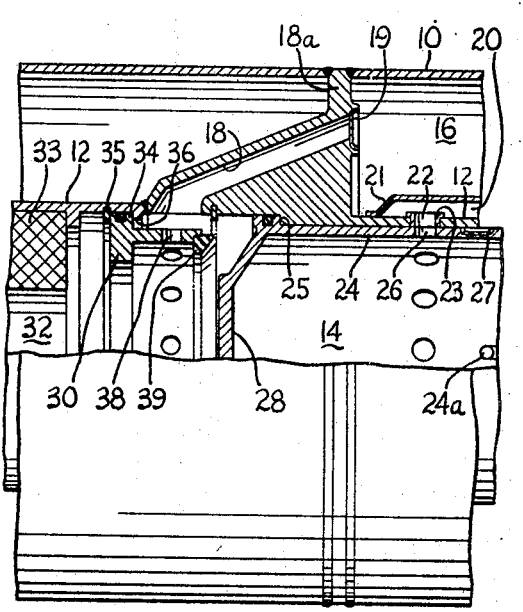
FIGURE 2 is a similar view of the invention in maximum fluid flow position.

The chamber 14 is provided with a shear slide 24 movable from a storage and ignition position against the open end of a valve body 30 (FIGURE 1) to a steady stage operation position against a shoulder 25 formed on the inner shell 12 (FIGURE 2). The slide 24 is provided with a plurality of circumferentially spaced propellant inlet ports and circular recesses 26 and 27 respectively, the latter being axially spaced aft of the former. It will be noted (FIGURE 1) that the shear cups 23 are supported by the slide recesses 27 and that movement of the slide 24 from storage to operative position upon ignition of the powerplant shears the cups 23 and aligns the propellant inlet ports 22 and 26 to admit propellant to the thrust chamber 14 under pressure of the generated pressurizing gases.

Figure 3:
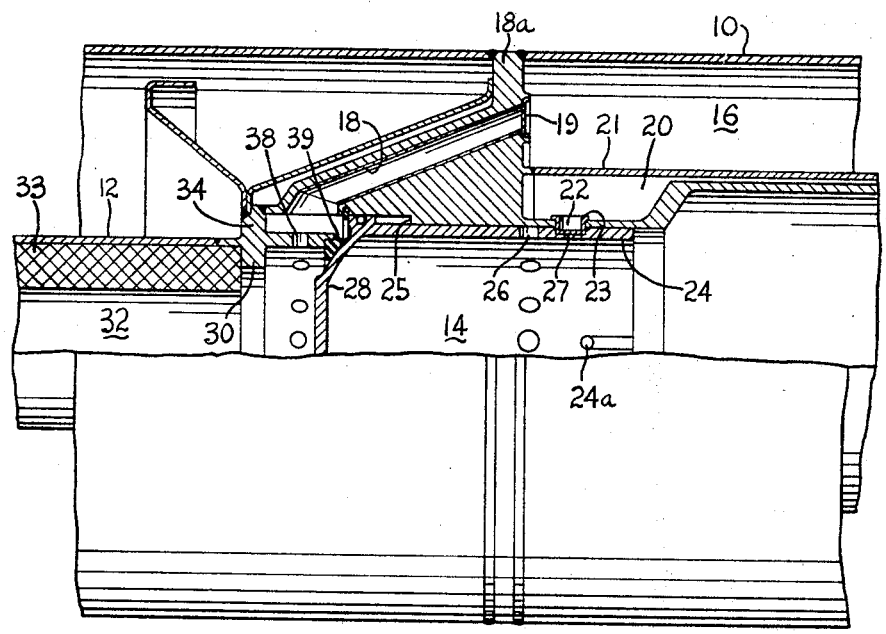
FIGURE 3 is a view identical with FIGURE 1 except that the valve body is shown as permanently rather than detachably mounted in the fluid flow line.

The inner shell 12 not only defines the thrust chamber 14 which is closed at its forward end by the head 28 of the slide 24, but also a generating chamber 32 containing a solid grain propellant 33, and a conduit for conducting generated pressure gases to the outlet or tank conduit 18. A ring or valve body 30 is spaced from the conduit wall and mounted by its annular flange 34 just aft of the generator 32 in the conduit section of the inner shell 12 by means of a snap ring and shoulder 35, 36 (FIGURES 1 and 2) or by welding (FIGURE 3). The ring is provided with a plurality of circumferentially spaced metering orifices 38 and its downstream end which abuts the head 28 of the shear slide 24 is provided with a pressure seal 39.

When the powerplant is to be fired, the solid grain 33 in the generator 32 is ignited, all of the ports being in the position shown in FIGURES 1 and 3, and pressure gases flow out of the generator into the conduit portion of the inner shell 12 and into the valve body or ring 30 from whence they are metered through the orifices 38. As the solid grain 33 burns, the pressure of the gases increases bursting the conduit seal 19 and the propellant in the tank 16 is thus pressurized.

As the pressure of the gases continues to build up, they attain a predetermined pressure which, acting on the head 28 of the shear slide 24, shears pin 24a holding the slide and moves the latter to the position of FIGURE 2 to shear the cups 23, align the propellant inlet ports 22 and 26, and admit the propellant to the thrust chamber 14 where ignition is effected. The limited pressurizing of the propellant tank up to this time ensures reliability of ignition and prevents ignition shock.

It is to be noted that movement of the shear slide 24 to the right, opens the downstream end of the valve ring 30 thus providing a large flow area for the pressurizing gases around its open end and into the tank conduits 18. Thus, when successful ignition has been effected and steady state operation achieved, the increased flow of the pressurizing gases prevent the heretofore present and characteristic high pressure drop in the system by minimizing the pressure drop to an acceptable level.

It is to be understood that the form of my invention herewith shown and described is to be taken as a preferred example of the same and that various changes in the shape, size and arrangement of parts may be resorted to without departure from the spirit of the invention or the scope of the subjoined claims.

I claim:
1. A liquid propellant rocket powerplant comprising, in combination, an outer shell and an inner shell defining a propellant tank and a combustion chamber, a port including a seal formed in said inner shell for flow of fluel from said tank to said chamber, a slide including a head and a port slidably mounted in said combustion chamber and movable by pressure gases to shear said seal and align said ports to admit propellant to said combustion chamber, means including a conduit for generating pressure gases to pressurize said tank and act against said head, and metering means mounted in said conduit and operable upon activation of said generating means to effect movement of said slide and to meter the pressure gases to said tank until ignition of said propellant in said combustion chamber and to then increase the flow of pressure gases to said tank.

2. The combination recited in claim 1 wherein said conduit mounted means comprises a body having an open downstream end and metering orifices communicating with said tank, and a member closing said open end and movable to open position by said pressure gases.

3. The combination recited in claim 2 wherein said closing member comprises the head of said slide.

4. The combination recited in claim 3 wherein said body comprises a ring.

5. The combination recited in claim 2 wherein said body comprises a ring.

References Cited

UNITED STATES PATENTS

| | | | |
|---|---|---|---|
| 2,659,197 | 1/1953 | Halford et al. | 60—35.6 |
| 3,041,828 | 7/1962 | Broders et al. | 60—35.6 |
| 3,151,448 | 10/1964 | White et al. | 60—35.6 |

SAMUEL FEINBERG, Primary Examiner

U.S. Cl. X.R.

60—258, 259